(12) United States Patent
Lehto

(10) Patent No.: US 11,815,164 B2
(45) Date of Patent: Nov. 14, 2023

(54) CONFIGURABLE SEAMLESS SHIFT GEARBOX AND ELECTROMECHANICAL SYSTEM

(71) Applicant: Motiomax Oy, Rovaniemi (FI)

(72) Inventor: Timo Lehto, Rovaniemi (FI)

(73) Assignee: Norrhydro Oy, Rovaniemi (FI)

( * ) Notice: Subject to any disclaimer, the term of this patent is extended or adjusted under 35 U.S.C. 154(b) by 0 days.

(21) Appl. No.: 17/964,122

(22) Filed: Oct. 12, 2022

(65) Prior Publication Data

US 2023/0135910 A1 May 4, 2023

(30) Foreign Application Priority Data

Oct. 28, 2021 (FI) ..................................... 20216114

(51) Int. Cl.
*F16H 3/54* (2006.01)
*F16H 59/40* (2006.01)
(Continued)

(52) U.S. Cl.
CPC ................ *F16H 3/54* (2013.01); *F16H 59/40* (2013.01); *F16H 59/42* (2013.01); *F16H 59/50* (2013.01);
(Continued)

(58) Field of Classification Search
CPC ......... F16H 61/0403; F16H 2200/2005; F16H 2061/0429
See application file for complete search history.

(56) References Cited

U.S. PATENT DOCUMENTS 2,718,797 A * 9/1955 Gravina ............... F16H 61/0262
475/155
6,276,182 B1 * 8/2001 Cernuschi ............. B21B 13/103
72/235
(Continued)

FOREIGN PATENT DOCUMENTS

CN 109973610 A * 7/2019
DE 3111178 A1 9/1982
(Continued)

OTHER PUBLICATIONS

Finnish Patent and Registration Office, Search Report, U.S. Appl. No. 20/216,114, dated Jan. 20, 2022, 1 page.
(Continued)

*Primary Examiner* — Stacey A Fluhart
(74) *Attorney, Agent, or Firm* — ZIEGLER IP LAW GROUP LLC

(57) ABSTRACT

Disclosed is a configurable seamless shift gearbox (100, 506). Configurable seamless shift gearbox comprises input shaft (102, 508) and output shaft (104, 510); gear arrangement (106) engaged between input and output shafts, configured to drive torque from input to output shaft. Gear arrangement comprises first gear member (202), second gear member (108), third gear member (118), and fourth gear member (110A, 110B) that rotationally arranges third gear member thereon; first clutch (112) configured to variably engage and disengage with fourth gear member to transfer input torque from input shaft to gear arrangement; and second clutch (114) configured to variably engage and disengage with second gear member to transfer input torque from gear arrangement to output shaft, wherein first and second clutch selectively engage and disengage with fourth and second gear member, respectively, at same time to
(Continued)

enable variable gear ratios for providing a seamless torque from input to output shaft.

11 Claims, 8 Drawing Sheets

(51) Int. Cl.
    *F16H 59/42*     (2006.01)
    *F16H 59/50*     (2006.01)
    *F16H 59/72*     (2006.01)
    *F16H 61/04*     (2006.01)
    *F16H 61/32*     (2006.01)
    *F16H 59/36*     (2006.01)

(52) U.S. Cl.
    CPC ......... *F16H 59/72* (2013.01); *F16H 61/0403* (2013.01); *F16H 61/32* (2013.01); *F16H 2059/366* (2013.01); *F16H 2061/0422* (2013.01); *F16H 2200/0043* (2013.01); *F16H 2200/2005* (2013.01); *F16H 2200/2035* (2013.01)

(56) References Cited

U.S. PATENT DOCUMENTS

| | | | |
|---|---|---|---|
| 3,303,458 | A1 | 11/2012 | Fukano et al. |
| 8,931,253 | B2 * | 1/2015 | Baudu ....................... H02K 7/06 |
| | | | 244/110 B |
| 10,495,191 | B1 * | 12/2019 | Eo ........................... F16H 3/666 |
| 10,612,628 | B2 * | 4/2020 | Song, II ..................... F16H 3/78 |
| 10,746,262 | B2 * | 8/2020 | Chae ......................... F16H 3/64 |
| 11,148,521 | B2 * | 10/2021 | Dempel .............. B60K 6/48 |
| 2006/0102697 | A1 | 5/2006 | Nagai et al. |
| 2008/0048514 | A1 * | 2/2008 | Hoffmann ................ H02K 7/06 |
| | | | 310/78 |
| 2010/0029436 | A1 * | 2/2010 | Katsuta ................... B60L 58/12 |
| | | | 180/65.23 |
| 2012/0065016 | A1 | 3/2012 | Tamai et al. |
| 2014/0124988 | A1 * | 5/2014 | Hirdina ............... B29C 49/4284 |
| | | | 425/535 |
| 2014/0274523 | A1 | 9/2014 | Potter |
| 2016/0003351 | A1 * | 1/2016 | Park .................... F16H 61/0213 |
| | | | 475/153 |
| 2017/0130809 | A1 * | 5/2017 | Rath ...................... G02B 7/005 |
| 2018/0119784 | A1 * | 5/2018 | Cui ..................... F16H 57/0441 |
| 2019/0003600 | A1 * | 1/2019 | Reich ...................... F16K 3/029 |
| 2019/0084575 | A1 * | 3/2019 | Luo ........................ B60W 10/02 |

FOREIGN PATENT DOCUMENTS

| | | | | |
|---|---|---|---|---|
| DE | 102018003180 | A1 * | 10/2018 | ............. B60K 17/28 |
| EP | 0372219 | A2 | 6/1990 | |
| EP | 0694132 | B1 | 3/1997 | |
| JP | 2003184982 | A | 7/2003 | |
| JP | 2008075799 | A * | 4/2008 | |
| WO | WO-2019230021 | A1 * | 12/2019 | .......... B60L 15/2054 |

OTHER PUBLICATIONS

European Patent Office, Extended European search report, Application No. 22200246, dated Mar. 24, 2023, 27 pages.

* cited by examiner

CONFIGURABLE SEAMLESS SHIFT GEARBOX AND ELECTROMECHANICAL SYSTEM

TECHNICAL FIELD

The present disclosure relates generally to electromechanical cylinders; and more specifically, to configurable seamless shift gearbox. The present disclosure also relates to electromechanical system employing the configurable seamless shift gearbox.

BACKGROUND

Generally, mechanical systems across automobile industry and other goods manufacturing and processing industry require a precise and a wide range of speed and force to operate machines. The desired range of force and speed is typically achieved by using linear actuators. A linear actuator is a mechanical device that converts a form of energy, such as electrical energy or a pressure, into a linear motion to a component (such as a shaft or a piston) therein, the component being configured to move along a straight line. Linear actuators are widely used in mechanical systems for handling, lifting, lowering, sliding, pressing, or tilting thereof. Linear actuators may typically be actuated using electricity (referred to as electric, piezoelectric or electromechanical actuators), pressurized liquid (referred to as hydraulic actuators), pressurized air (referred to as pneumatic actuators), for example. It will be appreciated that the linear actuators come in several configurations to fit any possible application, environment, or setting.

Conventionally, hydraulic actuators and pneumatic actuators are used widely for providing tension, compression or combined applications. Hydraulic actuators comprise a hollow cylinder having a piston inserted therein, and an unbalanced pressure, from a liquid, is applied to the piston to generate a force that moves an external object coupled thereto. Notably, liquids are nearly incompressible therefore the hydraulic actuators provide a controlled and precise linear displacement of the piston. Similarly, pneumatic actuators comprise a hollow cylinder having a piston inserted therein, and use compressed air to pressure the piston to generate a force that moves an external object coupled thereto. However, pneumatic actuators are not suitable for heavy-duty machinery and applications where large amount of weight is involved. Furthermore, hydraulic actuators and pneumatic actuators are more susceptible to pressure loss, thus less efficient.

Recently, electromechanical actuators coupled with one or more motors are widely used as linear actuators. The electromechanical actuators typically use motors that convert energy into torque that is further converted into a linear displacement of a component (such as a shaft) attached to the motor. In operation, the electromechanical actuators have a shaft connected to the motor, and a gearbox comprising a plurality of gears. The gears are arranged to provide the torque to rotate the shaft. The high-speed rotational motion is reduced by the gearbox to increase the torque by turning the shaft. However, the electromechanical cylinders are often inefficient when rapid movement and slow movement are needed in rapid operating sequences. Moreover, to provide rapid movement and/or slow movement from the electromechanical actuator, a single fixed gear ratio is not enough. In this regard, a number or size of the electric motor could be increased. However, increasing the number or size of the electric motor increases the cost of installation and makes the device bulky. Moreover, changing the gear ratio to provide a continuous torque may require the motor to be stopped in conventional electromechanical actuators.

Therefore, in light of the foregoing discussion, there exists a need to overcome the aforementioned drawbacks of the conventional mechanical and hydraulic systems.

SUMMARY

The present disclosure seeks to provide a configurable seamless shift gearbox. The present disclosure also seeks to provide an electromechanical system. The present disclosure seeks to provide a solution to the existing problem of controlling movements of the drive shafts. An aim of the present disclosure is to provide a solution that overcomes at least partially the problems encountered in prior art, and provides an efficient and robust electromechanical system for providing a continuous torque during frequent gear change activity.

In one aspect, an embodiment of the present disclosure provides a configurable seamless shift gearbox comprising:
  an input shaft configured to receive an input torque from a motor;
  an output shaft configured to provide an output torque;
  a gear arrangement engaged between the input shaft and the output shaft, configured to drive a torque from the input shaft to the output shaft, the gear arrangement comprising:
    a first gear member coupled to the input shaft,
    a second gear member,
    a third gear member configured to intermesh with the first gear member and the second gear member, and
    a fourth gear member configured to rotationally arrange the third gear member thereon;
  a first clutch arranged with the input shaft and the gear arrangement, wherein the first clutch is configured to variably engage and disengage with the fourth gear member of the gear arrangement to transfer the input torque from the input shaft to the gear arrangement; and
  a second clutch arranged with the gear arrangement and the output shaft, wherein the second clutch is configured to variably engage and disengage with the second gear member of the gear arrangement to transfer the input torque from the gear arrangement to the output shaft,
wherein the first clutch and the second clutch selectively engage and disengage with the fourth gear member and the second gear member, respectively, at the same time to enable variable gear ratios for providing a seamless torque from the input shaft to the output shaft.

In another aspect, an embodiment of the present disclosure provides an electromechanical system comprising:
  a motor configured to provide an input torque;
  an electromechanical stepless cylinder to receive an output torque;
  a configurable seamless shift gearbox that is mechanically coupled to the motor via an input shaft to receive the input torque therefrom, and the electromechanical stepless cylinder via the output shaft to deliver output torque thereto, wherein the configurable seamless shift gearbox comprises:
    a gear arrangement engaged between the input shaft and the output shaft, configured to drive torque from the input shaft to the output shaft, the gear arrangement comprising:
      a first gear member coupled to the input shaft,
      a second gear member, a third gear member configured to intermesh with both the first gear member and the second gear member, and a fourth gear member configured to rotationally arrange the third gear member thereon;

a first clutch arranged with the input shaft and the gear arrangement, wherein the first clutch is configured to variably engage and disengage with the fourth gear member of the gear arrangement to transfer the input torque from the input shaft to the gear arrangement; and a second clutch arranged with the gear arrangement and the output shaft, wherein the second clutch is configured to variably engage and disengage with the second gear member of the gear arrangement to transfer the input torque from the gear arrangement to the output shaft, wherein the first clutch and the second clutch selectively engage and disengage with the fourth gear member and the second gear member, respectively, at the same time to enable variable gear ratios for providing a seamless torque from the input shaft to the output shaft; and a control unit configured to control:
the motor to: start, stop, and adjust speed of the input shaft; and
the first clutch and the second clutch to selectively engage and disengage with the gear arrangement.

Embodiments of the present disclosure substantially eliminate or at least partially address the aforementioned problems in the prior art, and provide a configurable seamless shift gearbox. The configurable seamless shift gearbox is designed to be energy-efficient, environment-friendly, a practical easy-to-install electromechanical system. Moreover, the configurable seamless shift gearbox provides safer working environment and better connectivity to automation systems. Furthermore, the configurable seamless shift gearbox has lower audible noise level. Additionally, the configurable seamless shift gearbox is precise and thus easy to control the movement of the shafts. Additionally, the configurable seamless shift gearbox provides wider range of speed and force variations while providing a continuous torque without requiring the motor to be stopped. Moreover, the configurable seamless shift gearbox reduces the number and size of the electric motors employed by the conventional mechanical and electromechanical systems, thereby reducing the overall weight of the machine for providing wider implementations.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
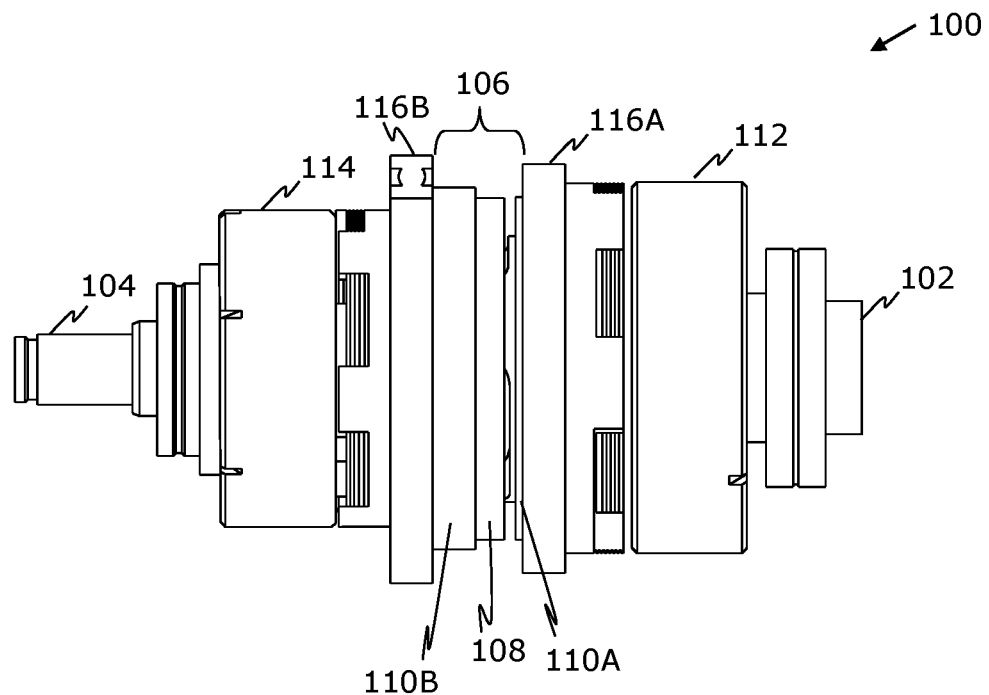
FIG. 1A is a schematic illustration of a configurable seamless shift gearbox, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a configurable seamless shift gearbox comprising:
an input shaft configured to receive an input torque from a motor;
an output shaft configured to provide an output torque;
a gear arrangement engaged between the input shaft and the output shaft, configured to drive a torque from the input shaft to the output shaft, the gear arrangement comprising:
a first gear member coupled to the input shaft,
a second gear member,
a third gear member configured to intermesh with the first gear member and the second gear member, and a fourth gear member configured to rotationally arrange the third gear member thereon;

a first clutch arranged with the input shaft and the gear arrangement, wherein the first clutch is configured to variably engage and disengage with the fourth gear member of the gear arrangement to transfer the input torque from the input shaft to the gear arrangement; and a second clutch arranged with the gear arrangement and the output shaft, wherein the second clutch is configured to variably engage and disengage with the second gear member of the gear arrangement to transfer the input torque from the gear arrangement to the output shaft, wherein the first clutch and the second clutch selectively engage and disengage with the fourth gear member and the second gear member, respectively, at the same time to enable variable gear ratios for providing a seamless torque from the input shaft to the output shaft.

In another aspect, an embodiment of the present disclosure provides an electromechanical system comprising:

a motor configured to provide an input torque;

an electromechanical stepless cylinder to receive an output torque;

a configurable seamless shift gearbox that is mechanically coupled to the motor via an input shaft to receive the input torque therefrom, and the electromechanical stepless cylinder via the output shaft to deliver output torque thereto, wherein the configurable seamless shift gearbox comprises:

a gear arrangement engaged between the input shaft and the output shaft, configured to drive torque from the input shaft to the output shaft, the gear arrangement comprising:

a first gear member coupled to the input shaft, a second gear member, a third gear member configured to intermesh with both the first gear member and the second gear member, and a fourth gear member configured to rotationally arrange the third gear member thereon;

a first clutch arranged with the input shaft and the gear arrangement, wherein the first clutch is configured to variably engage and disengage with the fourth gear member of the gear arrangement to transfer the input torque from the input shaft to the gear arrangement; and a second clutch arranged with the gear arrangement and the output shaft, wherein the second clutch is configured to variably engage and disengage with the second gear member of the gear arrangement to transfer the input torque from the gear arrangement to the output shaft, wherein the first clutch and the second clutch selectively engage and disengage with the fourth gear member and the second gear member, respectively, at the same time to enable variable gear ratios for providing a seamless torque from the input shaft to the output shaft; and a control unit configured to control:

the motor to: start, stop, and adjust speed of the input shaft; and the first clutch and the second clutch to selectively engage and disengage with the gear arrangement.

The present disclosure provides the aforementioned configurable seamless shift gearbox and the aforementioned electromechanical system. The electromechanical system employs the configurable seamless shift gearbox that is configured to provide variable gear ratios and resulting continuous torque. In this regard, the configurable seamless shift gearbox comprises at least two clutches that may be variably engaged and disengaged to achieve wider range of speed over the continuous toque without requiring the motor to be stopped. The engaging and disengaging of the at least two clutches enable the gear ratios to change smoothly to subsequently change the speed and the acceleration of the output shaft. Beneficially, the configurable seamless shift gearbox provides at least four gear ratios to selectively change the torque and provide benefits of an emergency braking system without requiring an additional braking system. Additionally, the configurable seamless shift gearbox provides better connectivity to automation systems. Moreover, the configurable seamless shift gearbox has a simple design with only a few components that utilize less power, thereby making the electromechanical system energy efficient and environmental-friendly.

The term "gearbox" as used herein refers to a fully integrated mechanical device that is configured to transfer mechanical energy from a rotating power source to a driven part, by increasing or decreasing torque while reducing or increasing a speed of the driven part. Notably, the gearbox is an arrangement of gear and gear trains arranged in a geometry that is configured to provide variable speed and variable torque from a rotating power source, such as the motor, to an output source, such as the output shaft. Typically, the gears arranged inside of the gearbox can be of any number or of any types, like bevel gears, spiral bevel gears, worm gears, and planetary gears (or epicyclic gear), that are mounted on a shaft, which is rotatably supported by a rolling element, such as bearings. The term "configurable seamless shift gearbox" as used herein refers to the gearbox that is configured to provide smooth gear shifting, such as from a high gear to a low gear and vice versa, while increasing or decreasing torque or while reducing or increasing speed of the driven part. Beneficially, the configurable seamless shift gearbox enables the driven part to not feel any interruption in the flow of torque. Thus, the configurable seamless shift gearbox may be used in a variety of different applications, such as wind turbines, agricultural, industrial, construction, mining and automotive equipment.

The term "input shaft" as used herein refers to an elongate element having a proximal end operatively coupled with the motor and a distal end operatively coupled with the gear arrangement. Generally, the shaft transmits power between the power source and the power absorbing machines via other intermediary components. For example, the shaft can be a countershaft, a line shaft, or an overhead shaft, used for the transmission of torque. Specifically, herein the input shaft is configured to provide the input torque from the motor to the gear arrangement. The term "input torque" refers to a force that tends to cause rotation of the input shaft, such as about an axis, to deliver the input torque to the output shaft via intermediary gear arrangement and the first clutch and the second clutch. Optionally, the input shaft may be a solid or a hollow rod having a cylindrical, a cuboidal, or any other polygonal shape.

Optionally, the motor is an electric motor. Typically, the electric motor converts the electrical energy into the mechanical energy. Moreover, the electric motors can be powered by direct current (DC) sources, such as batteries or rectifiers, or by alternating current (AC) sources, such as a power grid, inverters or electrical generators. Typically, the electric motors produce a linear force or a rotary force i.e., torque intended to rotate the driving part, such as the input shaft, coupled to it. Generally, the electric motor is designed for continuous rotation and for providing the torque over a significant distance covered by the configurable seamless shift gearbox and power absorbing machine. Typically, the electric motors are power efficient, lightweight, robust, are mechanically simple and cheap to manufacture for the electromechanical system. Optionally, the smaller size electric motors designed for the electromechanical system can be used easier for other purposes also. Furthermore, the electric motor can provide instant and consistent torque at any speed in the electromechanical system and can run on electricity generated by renewable sources and do not or negligibly contribute to greenhouse effect. Besides electric motor, optionally, the motor may be selected but not limited to hydraulic motor, gear motor, pneumatic motor and the like.

The term "output shaft" as used herein refers to an elongate element having a proximal end operatively coupled with the gear arrangement and a distal end operatively coupled to the power absorbing machine to provide the required output torque thereto. The term "output torque" as used herein refers to a force that tends to cause rotation of the output shaft, such as about an axis, to deliver the output torque from the gear arrangement and the second clutch to the power absorbing machine. Optionally, the output shaft may be a solid or a hollow rod having a cylindrical, a cuboidal, or any other polygonal shape. It will be appreciated that the shape and size of the input shaft and the output shaft may be same or different.

The term "gear arrangement" as uses herein refers to an arrangement of gears and gear trains inside a gearbox, such as the configurable seamless shift gearbox, to modulate, such as by increasing, decreasing or maintaining, the input torque from the input shaft to the output shaft. Herein, the gear arrangement is implemented as a planetary gear system (or epicyclic gear system). Typically, the planetary gear system (or epicyclic gear system) comprises carrier that carries a central sun gear, a plurality of planet gears, arranged on a ring gear, revolving around the central sun gear, when in use. Moreover, the planet gear and the sun gear intermesh so that their pitch circles roll without a slip.

The gear arrangement comprises the first gear member implemented as the central sun gear, the second gear member implemented as the ring gear, the third gear implemented as the planet gears, and the fourth gear member implemented as the carrier. The first gear member coupled to the input shaft to rotate the first gear member based on the input torque received from the motor. The third gear member intermesh with the first gear member and the second gear member. Therefore, the torque from the first gear member is distributed to the third gear member which can either be used to drive the second gear member or the output shaft. Moreover, the first gear member takes a high-speed, low-torque input and drives the third gear member which increases the torque. The fourth gear member is configured to rotationally arrange the third gear member thereon to control the torque. It will be appreciated that the first gear member of the gearbox drives the third gear member which is fixed to the fourth gear member, and when the first gear member is driven by the torque from the input shaft, the third gear member rotates the second gear member. Optionally, the first gear member, the second gear member, the third gear member, and the fourth gear member are fabricated from the steel, cast iron, aluminum, brass, plastics, composites and the like, having high strength and operable at high speeds.

Optionally, the configurable seamless shift gearbox further comprises a pair of bearings, arranged on end portions of the gear arrangement, configured to rotatably support the input shaft, the output shaft and the gear arrangement. The term "bearing" as used herein refers to a rolling-element bearing that uses balls or rollers to maintain the separation between the bearing races. The bearing races are rings separated by a groove where the balls or rollers rest. Additionally, one race may be stationary and the other may be attached to the rotating assembly (for example, a hub or shaft). In this regard, the bearing is used to reduce rotational friction and support the input shaft and output shaft from radial and axial loads due to the rotation of the motor. Moreover, the bearing, while facilitating motion, support both the rotation of the input shaft and output shaft and the force applied by the gear arrangement. Furthermore, the bearings are arranged between the input shaft and a first end portion of the gear arrangement and between the output shaft and a second end portion of the gear arrangement. The bearing may include, but are not limited to, ball bearing, roller bearing, deep-groove bearings, angular contact bearing, self-aligning bearing, and thrust bearing.

The term "first clutch" and "second clutch" as used herein refer to mechanical devices that engage and disengage the power transmission from the input shaft to the output shaft. Notably, the first clutch and the second clutch connect and disconnect the rotating input shaft and the output shaft, respectively, to deliver desired output torque. The first clutch is coupled with the input shaft and is configured to variably engage and disengage with the fourth gear member of the gear arrangement to transfer the input torque from the input shaft to the gear arrangement. The second clutch is coupled with the output shaft and is configured to variably engage and disengage with the second gear member of the gear arrangement to transfer the input torque from the gear arrangement to the output shaft. Furthermore, the first clutch and the second clutch may be actuated through electric power which releasably connect the input shaft and the output shaft respectively when the electric power is provided and disconnect the input shaft and the output when the electric power is released. The first clutch releasably connects the input shaft to the fourth gear member of the gear arrangement and the second clutch releasably connects the gearbox output shaft to the second gear member of the gear arrangement.

Optionally, at least one of the first clutch and the second clutch is an electric multi-plate clutch. The term "multi-plate clutch" as used herein refers to the clutch in which two or more clutch plates are used simultaneously. Notably, the electric multi-plate clutch operates electrically but transmits torque mechanically. The electric multi-plate clutch is also referred to as electromechanical clutch. Typically, a clutch plate is a metallic plate having frictional lines at its outer surfaces. The frictional lines contact with the input shaft and the output shaft to deliver torque. Furthermore, the electric multi-plate clutch has high torque transmission capacity and increases an acceleration due to an increase in frictional lines of the two or more clutch plates. Beneficially, the multi plate clutches are smooth, simple and easy to operate due to the assembly of frictional lines thereof. Additionally, the multi plate clutches may be used in compact machinery.

Alternatively, the clutches may include, but are not limited to, friction clutch, cone clutch, centrifugal clutch, semi-centrifugal clutch, diaphragm clutch, dog and spline clutch, vacuum clutch, hydraulic clutch, and freewheel clutch.

Moreover, the first clutch and the second clutch selectively engage and disengage with the fourth gear member and the second gear member, respectively, at the same time to enable variable gear ratios for providing a seamless torque from the input shaft to the output shaft. The term "gear ratio" as used herein refers to the ratio of the number of rotations of a driver gear to the number of rotations of a driven gear. It will be appreciated that when the driver gear is the first gear member then the driven gear is at least one of: the second gear member, the third gear member, and the fourth gear member; and when the driver gear is the second gear member then the driven gear is at least one of: the first gear member, the third gear member, and the fourth gear member; and/or any such combinations. Moreover, by varying the gear ratio the output torque can also be varied, for example for increasing the speed the incremental gear ratio is used, i.e. 1:2, 1:4, 1:6, and the like, and for decreasing the speed the reducing gear ratio is used, i.e. 3:1, 5:1, 7:1, and the like. The term "seamless torque" as used herein refers to the ability of the gearbox to transfer a continuous torque from the input shaft to the output shaft without any interruption or jerk. It will be appreciated that the torque is a function of gear ratios and the seamless torque is provided when the gear ratios change smoothly by varying the engagement and disengagement of the first clutch and/or the second clutch with the input shaft and the fourth gear member and/or the output shaft and the second gear member, respectively.

The first clutch and the second clutch selectively engage and disengage with the fourth gear member and the second gear member, respectively, at the same time to enable variable gear ratios. The engaging and disengaging of the first clutch and the second clutch provides the seamless torque. It will be appreciated that the simultaneous, selective engaging and disengaging of the first clutch and the second clutch renders a continuous rotary motion of the gears and transfer of torque while achieving wider range of speed over the continuous torque without requiring the motor to be stopped. The engaging and disengaging of the first clutch and the second clutch enables the gear ratio to change and subsequently change the speed and the acceleration of the output shaft. Typically, the engaging and disengaging of the first clutch and the second clutch transmit the torque from the engine to the output shaft smoothly and quietly to reduce a potential vibration, jerk, or interruption.

Optionally, the first clutch and the second clutch are in:
the open configuration when the first clutch and the second clutch are not engaged with the fourth gear member of the gear arrangement and the second gear member of the gear arrangement, respectively; or
the closed configuration when the first clutch and the second clutch are engaged with the fourth gear member of the gear arrangement and the second gear member of the gear arrangement, respectively.

In this regard, the term "open" as used herein refers to the positioning of the first clutch and the second clutch in an opposite direction from the gear arrangement. Said opposite direction is for example in direction of the input shaft for the first clutch and in direction of the output shaft for the second clutch. In the open configuration, the first clutch and the second clutch are coupled with the input shaft and the output shaft, respectively, and do not couple or engage with the fourth gear member and the second gear member, respectively. Moreover, the term "close" as used herein refers to the positioning of the first clutch and the second clutch in a direction towards the gear arrangement. Said direction is for example in direction of the fourth gear member for the first clutch and in direction of the second gear member for the second clutch. In the close configuration, the first clutch and the second clutch are coupled with the input shaft and the output shaft as well as with the fourth gear member and the second gear member, respectively. Beneficially, selective open and close configuration of the first clutch and the second clutch enable changing gear ratio and subsequently changing the output torque and the speed of the output shaft, and keeping the output torque continuous.

Optionally, the configurable seamless shift gearbox provides:
a first gear ratio having both the first clutch and the second clutch in an open configuration;
a second gear ratio having the first clutch in the open configuration and the second clutch in a closed configuration;
a third gear ratio having the first clutch in the closed configuration and the second clutch in the open configuration; and
a fourth gear ratio having both the first clutch and the second clutch in the closed configuration.

In this regard, it will be appreciated that the selective open and close configurations of the first clutch and the second clutch provides variable gear ratio such as the first gear ratio, the second gear ratio, the third gear ratio and the fourth gear ratio. The first gear ratio is achieved when both the first clutch and the second clutch are not engaged with the fourth gear member of the gear arrangement and the second gear member of the gear arrangement, respectively. Moreover, such engagement of the first clutch and the second clutch provides the first gear ratio similar to a neutral gear. The second gear ratio is achieved when the first clutch is not engaged with the fourth gear member of the gear arrangement while the second clutch is engaged with the second gear member of the gear arrangement, respectively. The third gear ratio is achieved when the first clutch is engaged with the fourth gear member of the gear arrangement while the second clutch is not engaged with the second gear member of the gear arrangement respectively. The fourth gear ratio is achieved when both the first clutch and the second clutch are engaged with the fourth gear member of the gear arrangement and the second gear member of the gear arrangement, respectively. Moreover, in the fourth gear ratio both the input shaft and output shafts are mechanically connected to the gear arrangement via the first clutch and the second clutch, thereby stopping the output torque. Beneficially, the fourth gear ratio may be used to provide an emergency braking system, simply by using the first and the second clutches in a controlled manner, thereby eliminating a need for having a separate braking system (for example a mechanical spring as a typical construction). Additionally, beneficially, the emergency braking system reduces the size of the gearbox and removes structural and functional complexities associated with the conventional gearbox. In an example, there are huge and heavy paper rolls in a paper industry (machine) and it is difficult to stop them from rolling. In such a case, the first and the second clutches can be effectively used for stopping or braking the rolling paper to roll by using a mass and whole body of the configurable seamless shift gearbox, wherein the first and the second clutches are used for braking a heavy torque/load.

Optionally, the gear ratio is in a range of 1:1 to 1:10. The gear ratio may typically be from 1:1, 1:2, 1:3, 1:4, 1:5, 1:6, 1:7, 1:8 or 1:9 up to 1:2, 1:3, 1:4, 1:5, 1:6, 1:7, 1:8, 1:9 or 1:10. In an example, when the gear ratio is 1:2, one turn at the output shaft equals to two turns at the input shaft. In another example, the gear ratio is 1:1.35. Beneficially, changing gear ratio enables changing the output torque and the speed of the output shaft, and keeping the output torque continuous, at the same time optimizing the speed of the motor for better reliability and for longer lifetime of the electromechanical system. Optionally, a wide range of gear ratios makes a flexible use of the electromechanical system possible e.g. with a pressing machine while a fast acceleration and fast movement with e.g. 1:1 gear ratio on 4200 rpm from a top position is needed. When a pressing object is achieved a resisting power starts to increase while a motor speed and a torque start to decrease. Changing rapidly e.g. to 1:4 gear ratio a high torque with a low speed below 1000 rpm can still be maintained. When the pressing machine reaches the lowest position the gear ratio is changed back to 1:1 and a rotation of the motor is changed making a fast acceleration and fast movement on 4200 rpm back to the top position time and energy efficient.

The term "electromechanical system" as used herein refers to a power absorbing machine that employs the aforementioned configurable seamless shift gearbox for receiving a continuous torque thereby. The electromechanical system comprises a plurality of components, wherein at least one of said components is physically coupled to the output shaft of the configurable seamless shift gearbox. Typically, the rotary motion of the output shaft is converted into at least one of: a linear displacement, a bending motion, a rotary motion of the at least one component that is physically coupled to the output shaft. Optionally, electromechanical system comprises a plurality of gears that are configured to transfer the received output torque (from the output shaft) over a distance to a final power absorbing component, such as an electromechanical stepless cylinder or a part thereof, of the electromechanical system. Thus, the electromechanical system enables a large load to be moved over a predefined distance. Moreover, the electromechanical system offers a greater range of control and efficiency and may widely be implemented in automobiles, lifts, cranes, heavy machines, robotic arms, modular beds, modular doors, and so forth.

The electromechanical stepless cylinder is arranged at the receiving end of the electromechanical system to receive output torque. Typically, the electromechanical stepless cylinder is a hollow elongated body having a piston and associated components arranged therein. The electromechanical stepless cylinder does not need an oil that saves natural resources.

Optionally, the electromechanical system further comprises sensors, wherein the sensors are selected from at least one of: a temperature sensor, and a motion sensor. The sensor typically detects a change in a value of a condition or component of the electromechanical system and sends the sensor data for further analysis or action by for example, the control unit of the electromechanical system. Typically, the sensor converts a physical action into an electrical equivalent and delivers the electrical signals to be processed by the control unit.

Optionally, the temperature sensor is configured to measure the temperature of the first clutch, the second clutch, and an oil temperature. The temperature sensor measures the temperature of the components, or the inside of the electromechanical system as a whole, to maintain an optimum working temperature of the electromechanical system. Specifically, the temperature sensor measures the temperature of the first clutch and the second clutch that engage and disengage with the gear arrangement and in the process may measure the temperature rise in neighboring components, such as the gear arrangement and the input shaft and the output shaft, due to friction in said components. Additionally, the temperature sensor may measure the temperature of oil in the electromechanical system. It will be appreciated that the electromechanical system may use oil only as a lubricating fluid to lubricate the gear and the components of the motor. Moreover, the temperature sensor may be configured to measure the temperature of the components of the electromechanical stepless cylinder. Furthermore, the temperature sensor may sense the temperature rise in the components of the electromechanical system and may also reduce the speed of the motor in the electromechanical system or shut down the electromechanical system to protect from overheating while there is no need to have an external cooling system. Optionally, the temperature sensor can be a thermostat, thermocouple, resistance thermometer, thermistor and the like. Optionally, the temperature sensor can collect measurement data for service and future R&D purposes, Optionally, the motion sensor is configured to measure a speed of the motor, a speed of the input shaft, and a speed of the output shaft. Specifically, the motion sensor measures the speed, position, velocity, and acceleration of moving components of the motor, the input shaft, and the output shaft to define and select an optimum gear ratio. Additionally, the motion sensor may measure the speed, position, velocity, and acceleration of the electromechanical stepless cylinder. Optionally, the motion sensor is used outside of the electromechanical system measuring e.g. a position of a lever arm connected to the electromechanical stepless cylinder thus eliminating a potential flexure between the electromechanical stepless cylinder and the lever arm. Optionally, the motion sensor can be a microwave sensor, vibration sensor ultrasonic sensor, reflection motion sensor.

The control unit is configured to control the motor to: start, stop, and adjust speed of the input shaft and the first clutch and the second clutch to selectively engage and disengage with the gear arrangement. The term "control unit" as used herein refers to the software and/or hardware in electromechanical system that is operable to implement specific algorithms therein. Moreover, the control unit employs a processor configured to perform the abovementioned operations. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Furthermore, the term "processor" may refer to one or more individual processors, processing devices and various elements associated with the control unit. Additionally, the one or more individual processors, processing devices and elements are arranged in various architectures for responding to and processing the instructions that drive the electromechanical system.

The control unit may be coupled to one or more components of the electromechanical system, such as the motor, clutch, the electromechanical stepless cylinder, and the sensors. Specifically, the control unit controls the motor and the first clutch and the second clutch to control the desired output torque required to operate the electromechanical stepless cylinder. The control unit may be communicably coupled to the sensors. The control unit receives sensor data and controls the output of the one or more components of electromechanical system, such as the electromechanical stepless cylinder, based on the sensor data. In this regard, the control unit is coupled to the sensors associated with the motor, the first clutch, the second clutch, and the electromechanical stepless cylinder. The control unit receives the sensor data from the sensors and controls the motor, the first clutch, the second clutch, and the electromechanical stepless cylinder based on the sensor data.

Optionally, the control unit controls the first clutch and the second clutch such that the first clutch is closed and simultaneously the second clutch is opened with an optimized and controlled speed. The opening and closing of the first clutch and the second clutch refers to the open configuration and the close configuration of the first clutch and the second clutch, respectively. Notably, the control unit controls the simultaneous opening and closing of the first clutch and the second clutch to deliver the desired output speed while providing a continuous torque.

Optionally, the control unit controls the speed of the motor based on a change in the gear ratio. It will be appreciated that the gear ratio is changed depending upon the load on the output shaft or depending on the load requirements at the output shaft. Moreover, the change in gear ratio results in change of the output torque and subsequently the speed the output shaft. Notably, the change in speed is inversely proportional to the change in torque. Therefore, the control unit is configured to control the speed of the motor to change the torque, to provide the desired speed and continuous torque to the output shaft.

Optionally, the control unit is associated with a memory unit, and wherein the memory unit stores data associated with at least one of: the motor, the electromechanical stepless cylinder, the configurable seamless shift gearbox, the gear ratio, and sensor data. The term "memory unit" as used herein refers to a hardware device, also known as storage, storage medium, digital memory unit, or storage media that may store information either temporarily or permanently. Generally, the memory unit stores data, files, and the like in any format. The memory unit can be used either internally or externally depending upon the requirement of the control unit to store data. Beneficially, the stored data can be used to determine the optimum working of the electromechanical system to make the electromechanical system faster and more efficient by having at least one pre-set data configuration of the electromechanical system in the memory unit wherein there is no need to rely on data stored in an external memory or external server system. Optionally, the data stored in the memory unit can be used to collect a usage data of the electromechanical system for service purposes to increase reliability and to extend a lifetime of the electromechanical system. The memory unit may include, but is not limited to, an electronic storage device, a magnetic storage device, an optical storage device, an electromagnetic storage device, a semiconductor storage device, or any suitable combination of the foregoing. Examples of implementation of memory unit, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Optionally, the control unit is connected to a machine control unit. The machine control unit is capable of controlling one or more control units associated with one or more machines, such as the electromechanical stepless cylinders. The machine control unit can be an automatic or a manual system that controls several control units associated with one or more machines. Moreover, the machine control unit controls the electromechanical stepless cylinder and the control unit that controls the motor. In an exemplary implementation, a mining drill comprising one or more electromechanical systems to perform drilling. The mining drill has a drilling pattern which is pre-programmed in the memory unit of the control unit. The machine control unit controls the one or more control units of the one or more electromechanical systems to execute pre-programmed drilling pattern in a fully automatic way, unlike the conventional mining drills (and/or harvester or cranes) that employ hydraulic cylinders and manually-operated joysticks to control said systems.

DETAILED DESCRIPTION OF DRAWINGS

Figure 1B:
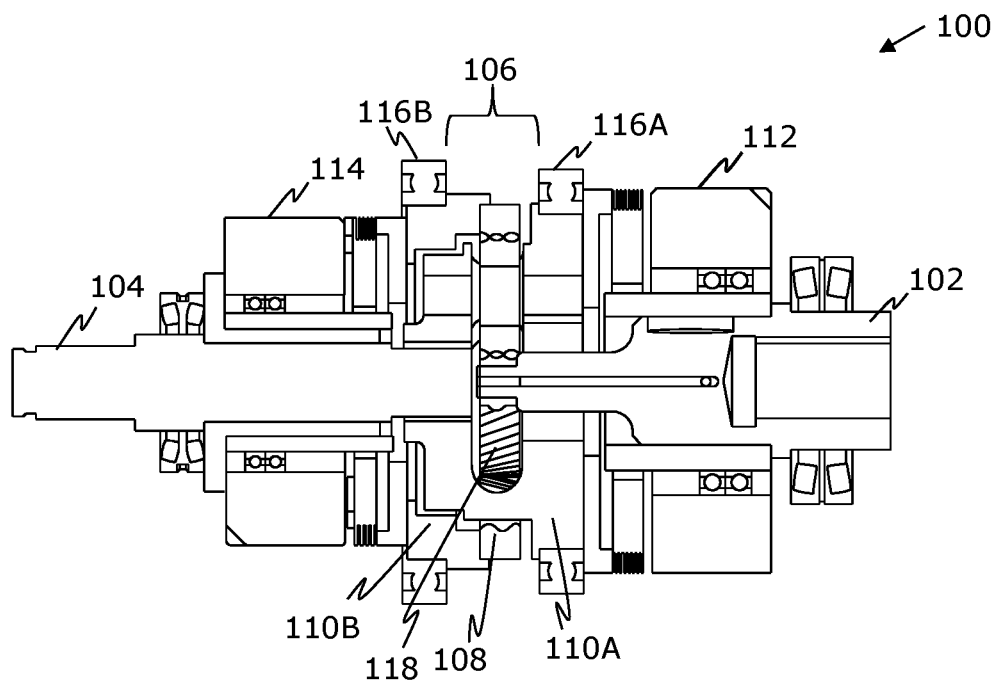
FIG. 1B is a cross-sectional view of a configurable seamless shift gearbox, in accordance with an embodiment of the present disclosure.

FIG. 1A and FIG. 1B are illustrations of a configurable seamless shift box 100. Referring to FIG. 1A, there is illustrated a schematic illustration of the configurable seamless shift gearbox 100, in accordance with an embodiment of the present disclosure. The configurable seamless shift gearbox 100 comprises an input shaft 102 configured to receive an input torque from a motor; an output shaft 104 configured to provide an output torque; a gear arrangement 106 engaged between the input shaft 102 and the output shaft 104, configured to drive a torque from the input shaft 102 to the output shaft 104. The gear arrangement 106 comprises a first gear member (not shown) coupled to the input shaft 102, a second gear member 108, a third gear member (not shown) configured to intermesh with the first gear member and the second gear member 108, and a fourth gear member 110A, 110B configured to rotationally arrange the third gear member thereon. The configurable seamless shift gearbox 100 further comprises a first clutch 112 and a second clutch 114. The first clutch 112 is arranged with the input shaft 102 and the gear arrangement 106, wherein the first clutch 112 is configured to variably engage and disengage with the fourth gear member 110A, 110B of the gear arrangement 106 to transfer the input torque from the input shaft 102 to the gear arrangement 106. The second clutch 114 arranged with the gear arrangement 106 and the output shaft 104, wherein the second clutch 114 is configured to variably engage and disengage with the second gear member 108 of the gear arrangement 106 to transfer the input torque from the gear arrangement 106 to the output shaft 104. Moreover, the first clutch 112 and the second clutch 114 selectively engage and disengage with the fourth gear member 110A, 110B and the second gear member 108, respectively, at the same time to enable variable gear ratios for providing a seamless torque from the input shaft 102 to the output shaft 104.

The configurable seamless shift gearbox 100 further comprises a pair of bearings 116A, 116B, arranged on end portions of the gear arrangement 106, configured to rotatably support the input shaft 102, the output shaft 104 and the gear arrangement 106.

Referring to FIG. 1B, there is illustrated a cross-sectional view of the configurable seamless shift gearbox 100, in accordance with an embodiment of the present disclosure. As shown, the gear arrangement 106 comprises the first gear member (not shown) coupled to the input shaft 102, the second gear member 108, the third gear member 118 configured to intermesh with the first gear member and the second gear member 108, and the fourth gear member 110A, 110B configured to rotationally arrange the third gear member 118 thereon.

Figure 2A:
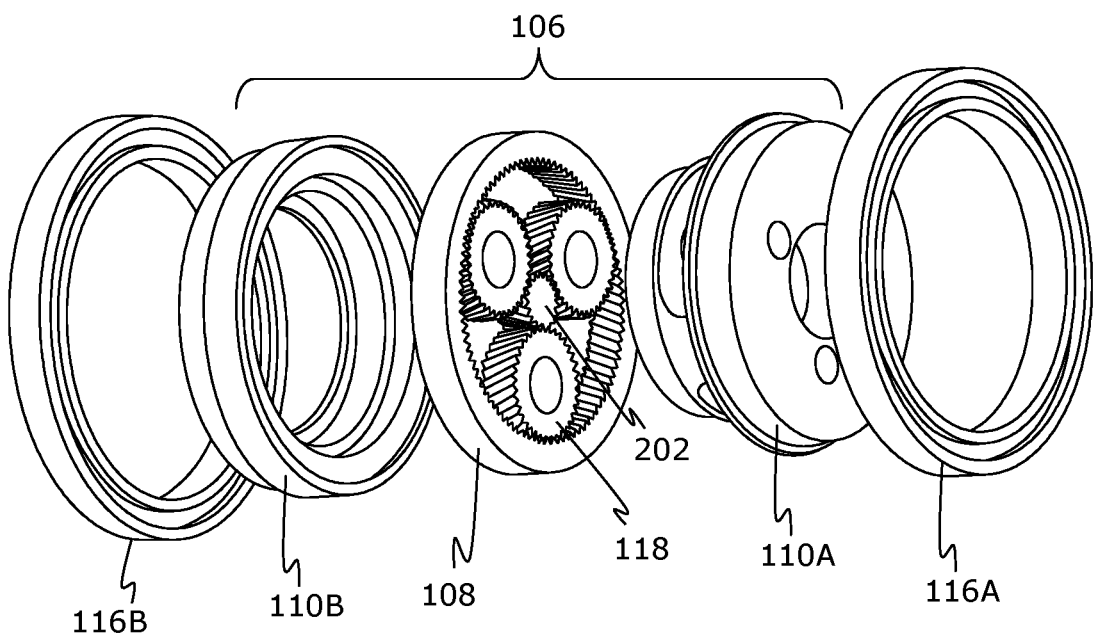
FIG. 2A is an exploded view of a gear arrangement, in accordance with an embodiment of the present disclosure.
Figure 2B:
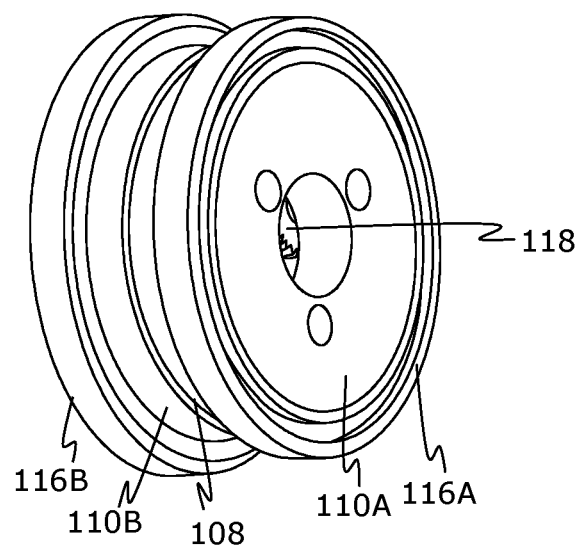
FIG. 2B is a schematic illustration of a gear arrangement, in accordance with an embodiment of the present disclosure.
Figure 2C:
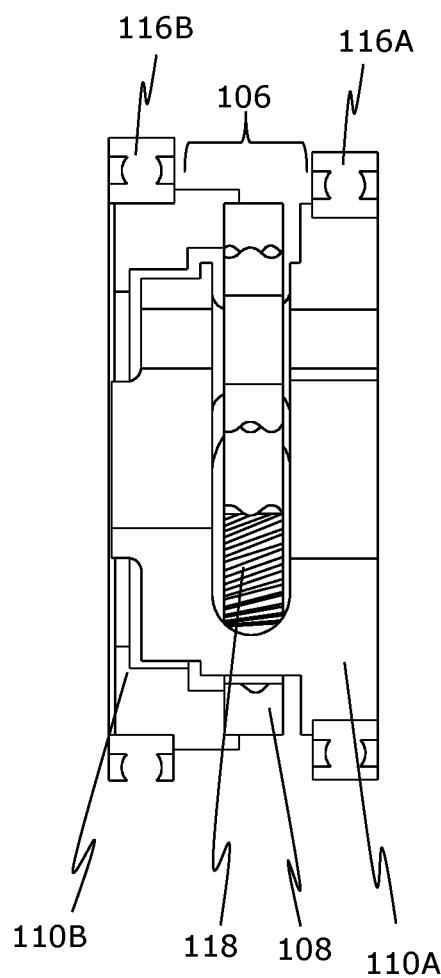
FIG. 2C is a cross-sectional view of a gear arrangement, in accordance with an embodiment of the present disclosure.

Figures FIGS. 2A, 2B and 2C are illustrations of a gear arrangement 106. Referring to FIG. 2A, there is illustrated an exploded view of the gear arrangement 106, in accordance with an embodiment of the present disclosure. The gear arrangement 106 comprises a first gear member 202, a second gear member 108, a third gear member 118 configured to intermesh with the first gear member 202 and the second gear member 108, and a fourth gear member 110A, 110B configured to rotationally arrange the third gear member 118 thereon. As shown, the first gear member 202 is a sun gear, the second gear member 108 is a ring gear, the third gear member 118 are the planet gears, and the fourth gear member 110A, 110B is the carrier that carries the first gear member 202, the second gear member 108, and the third gear member 118. It will be appreciated that the fourth gear member 110A, 110B is a set of two parts, wherein the fourth gear member 110B locks the fourth gear member 110A when the second gear member 108 is loaded on to the fourth gear member 110A, 110B. Moreover, a pair of bearings 116A, 1168, arranged on end portions of the gear arrangement 106, configured to rotatably support the gear arrangement 106 on the input shaft (shown as 102 in FIG. 1A) and the output shaft (shown as 104 in FIG. 1A).

Referring to FIG. 2B, there is illustrated a schematic illustration of the gear arrangement 106, in accordance with an embodiment of the present disclosure. The gear arrangement 106 comprises the first gear member (shown as 202 in FIG. 2A) the second gear member 108, the third gear member 118 configured to intermesh with the first gear member and the second gear member 108, and the fourth gear member 110A, 110B configured to rotationally arrange the third gear member 118 thereon. The pair of bearings 116A, 1168 is arranged on end portions of the gear arrangement 106.

Referring to FIG. 2C, there is illustrated a cross-sectional view of the gear arrangement 106, in accordance with an embodiment of the present disclosure. The pair of bearings 116A, 1168 are arranged on the end portions of the gear arrangement 106 as illustrated. The second gear member 108, the third gear member 118 and the fourth gear member 110A, 110B is also illustrated in the FIG. 2C.

Figure 3:
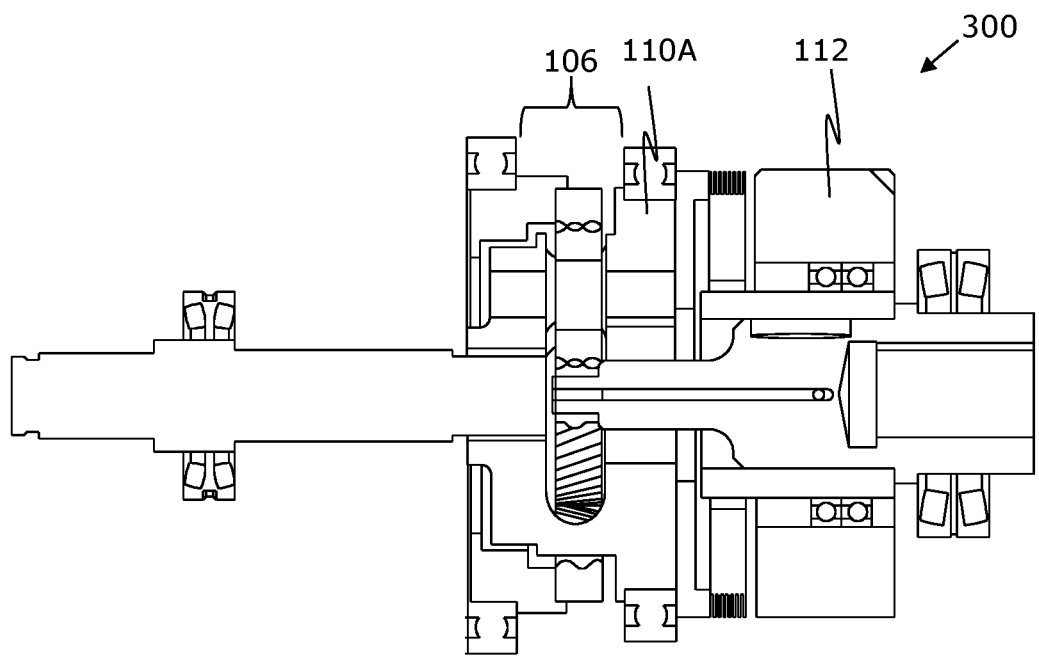
FIG. 3 is a cross-sectional view of a configurable seamless shift gearbox in a closed configuration, in accordance with an embodiment of the present disclosure.

Referring to FIG. 3, there is illustrated a cross-sectional view of a configurable seamless shift gearbox 100 in a closed configuration 300, in accordance with an embodiment of the present disclosure. As shown, the first clutch 112 is engaged with the fourth gear member 110A of the gear arrangement 106.

Figure 4:
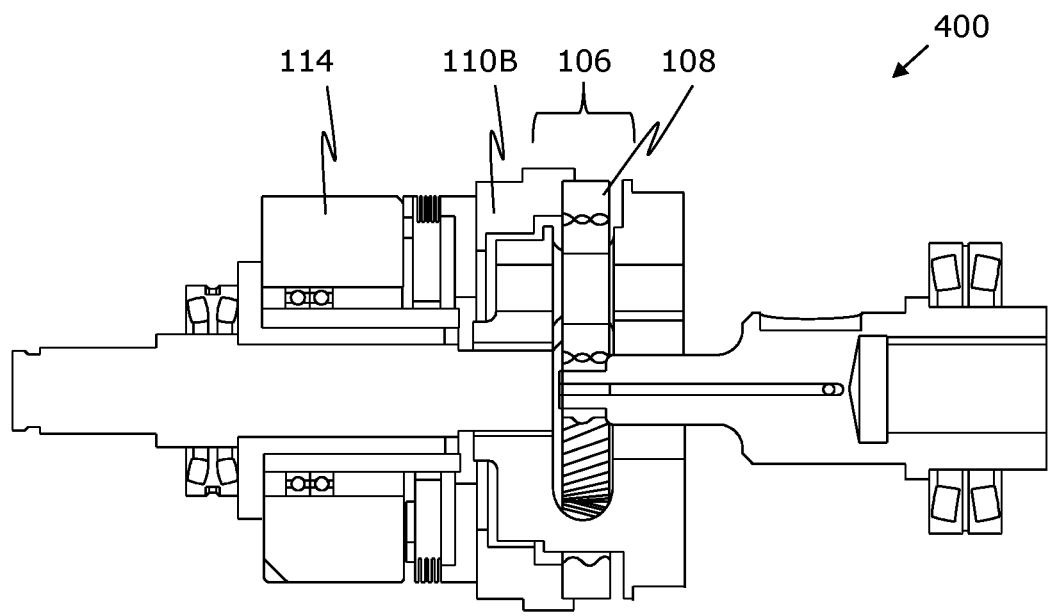
FIG. 4 is a cross-sectional view of a configurable seamless shift gearbox in a closed configuration, in accordance with another embodiment of the present disclosure.

Referring to FIG. 4, there is illustrated a cross-sectional view of a configurable seamless shift gearbox 100 in a closed configuration 400, in accordance with another embodiment of the present disclosure. As shown, the second clutch 114 is engaged with the fourth gear member 110B and the second gear member 108 of the gear arrangement 106.

Figure 5:
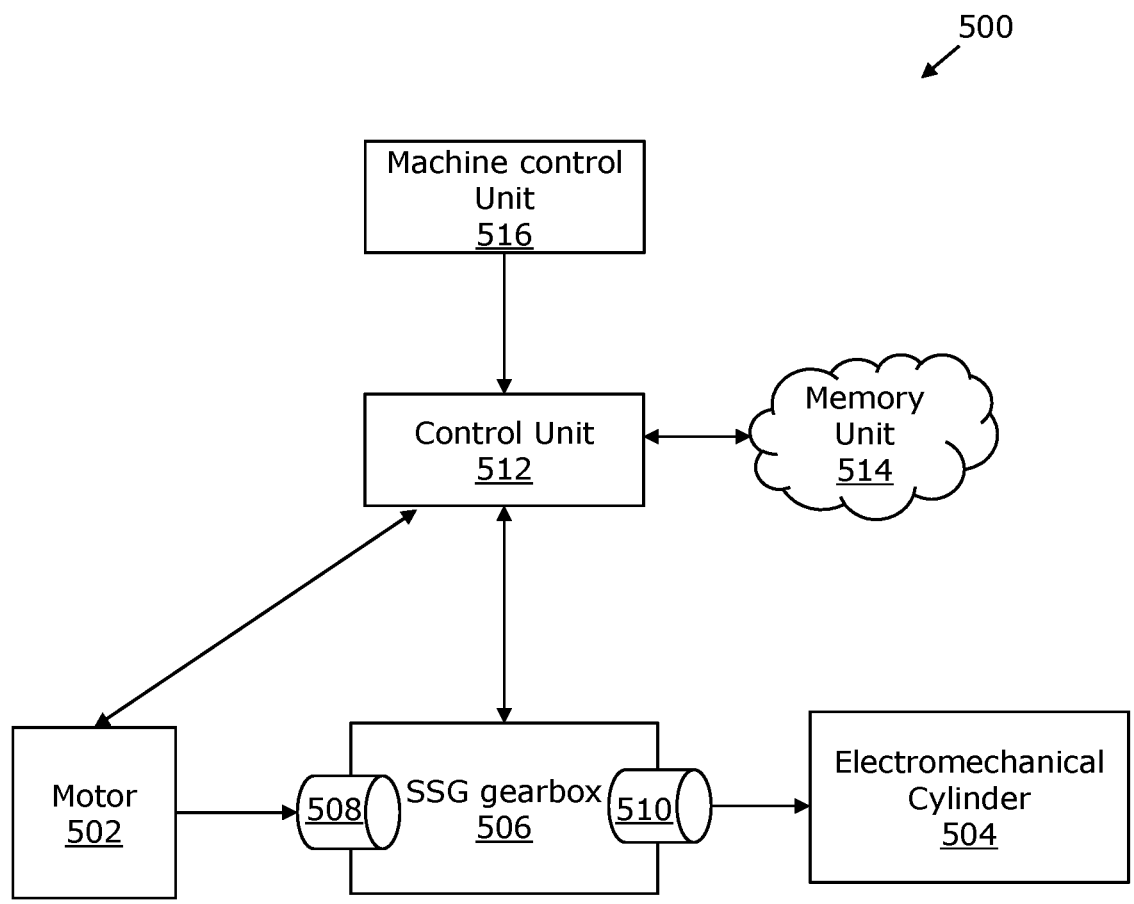
FIG. 5 is a block diagram of an electromechanical system, in accordance with an embodiment of the present disclosure.

Referring to FIG. 5, there is illustrated a block diagram of an electromechanical system 500, in accordance with an embodiment of the present disclosure. The electromechanical system 500 comprises a motor 502 configured to provide an input torque; an electromechanical stepless cylinder 504 to receive an output torque; a configurable seamless shift gearbox 506 (similar to the configurable seamless shift gearbox 100 of FIG. 1A), that is mechanically coupled to the motor 502 via an input shaft 508 (similar to the input shaft 102 of FIG. 1A), to receive the input torque therefrom, and the electromechanical stepless cylinder 504 via the output shaft 510 (similar to the output shaft 104 of FIG. 1A), to deliver output torque thereto.

Moreover, the configurable seamless shift gearbox 506 comprises a gear arrangement (similar to the gear arrangement 106 of FIG. 1A) engaged between the input shaft 508 and the output shaft 510, configured to drive torque from the input shaft 508 to the output shaft 510. The gear arrangement comprises a first gear member, such as the first gear member 202 of FIG. 2A, coupled to the input shaft 508; a second gear member, such as the second gear member 108 of FIG. 1A; a third gear member, such as the third gear member 118 of FIG. 1A, configured to intermesh with both the first gear member and the second gear member; and a fourth gear member, such as the fourth gear member 110A, 110B of FIG. 1A, configured to rotationally arrange the third gear member thereon.

Furthermore, the configurable seamless shift gearbox 506 comprises a first clutch, such as the first clutch 112 of FIG. 1A), and a second clutch, such as the second clutch 114 of FIG. 1A. The first clutch is arranged with the input shaft 508 and the gear arrangement, wherein the first clutch is configured to variably engage and disengage with the fourth gear member of the gear arrangement to transfer the input torque from the input shaft 508 to the gear arrangement. The second clutch is arranged with the gear arrangement and the output shaft 510, wherein the second clutch is configured to variably engage and disengage with the second gear member of the gear arrangement to transfer the input torque from the gear arrangement to the output shaft 510. Moreover, the first clutch and the second clutch selectively engage and disengage with the fourth gear member and the second gear member, respectively, at the same time to enable variable gear ratios for providing a seamless torque from the input shaft 508 to the output shaft 510.

Furthermore, the configurable seamless shift gearbox 506 comprises a control unit 512 configured to control: the motor 502 to: start, stop, and adjust speed of the input shaft 508; and the first clutch and the second clutch to selectively engage and disengage with the gear arrangement.

Additionally, the control unit 512 is connected to a machine control unit 514. The machine control unit 514 is capable of controlling one or more control units, such as the control unit 512, associated with one or more machines, such as the electromechanical stepless cylinder 504.

Figure 6:
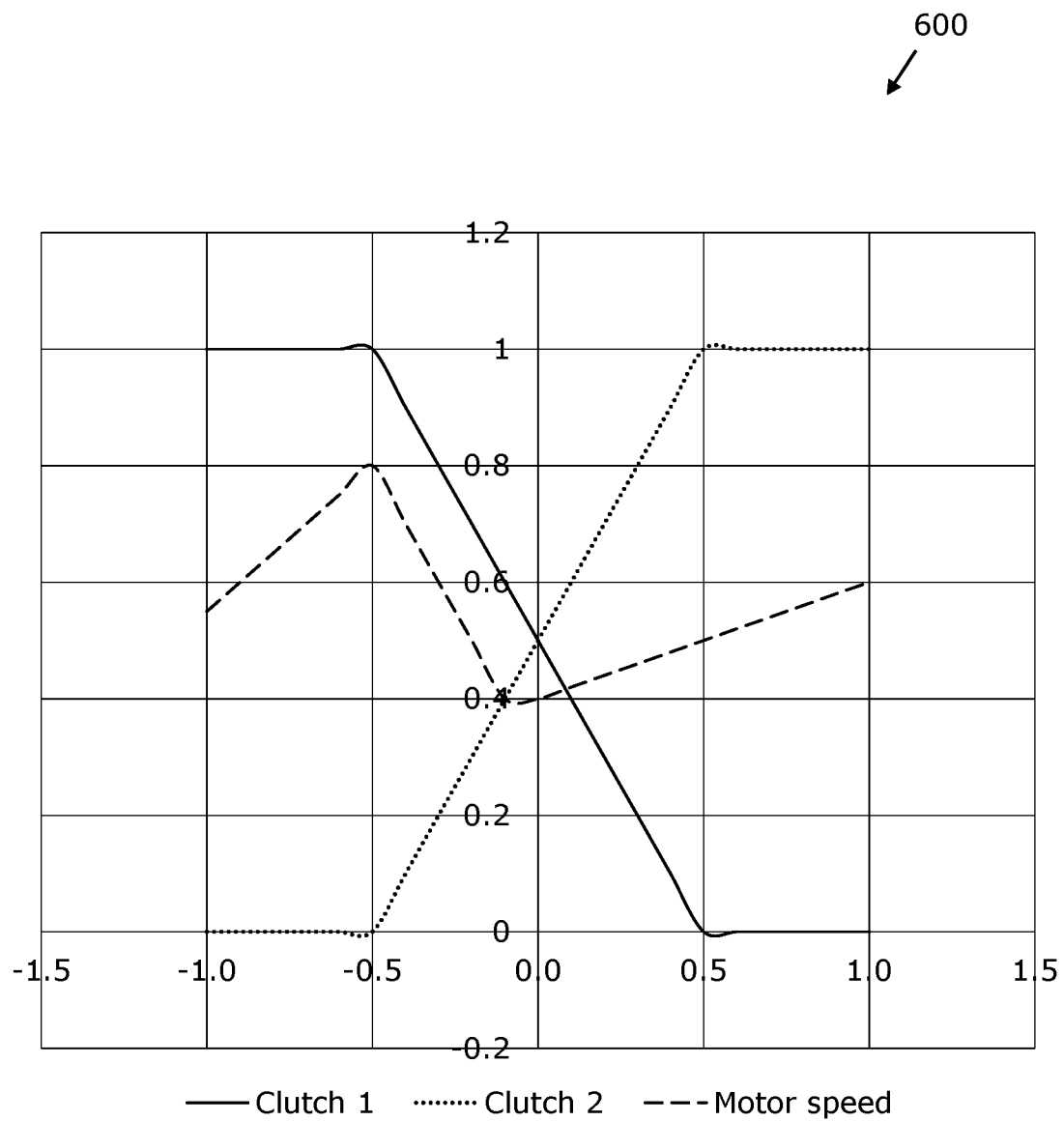
FIG. 6 is a graphical representation of acceleration parameters of an electromechanical system, in accordance with an embodiment of the present disclosure.

Referring to FIG. 6, there is illustrated a graphical representation 600 of acceleration parameters of an electromechanical system, in accordance with an embodiment of the present disclosure. As shown, as the gear ratio is changed from a Case 1 (i.e. the first clutch in the open configuration and the second clutch in the close configuration (selected according to third gear member e.g. 2, 3, 4, 5, 6 or 7)) to a Case 2 (i.e. the first clutch in the close configuration (gear ratio 1) and the second clutch in the open configuration), the motor speed increases before the change to 0.8 (80%) relative level and after the change to 0.6 (60%) relative level of the maximum motor speed.

Figure 7:
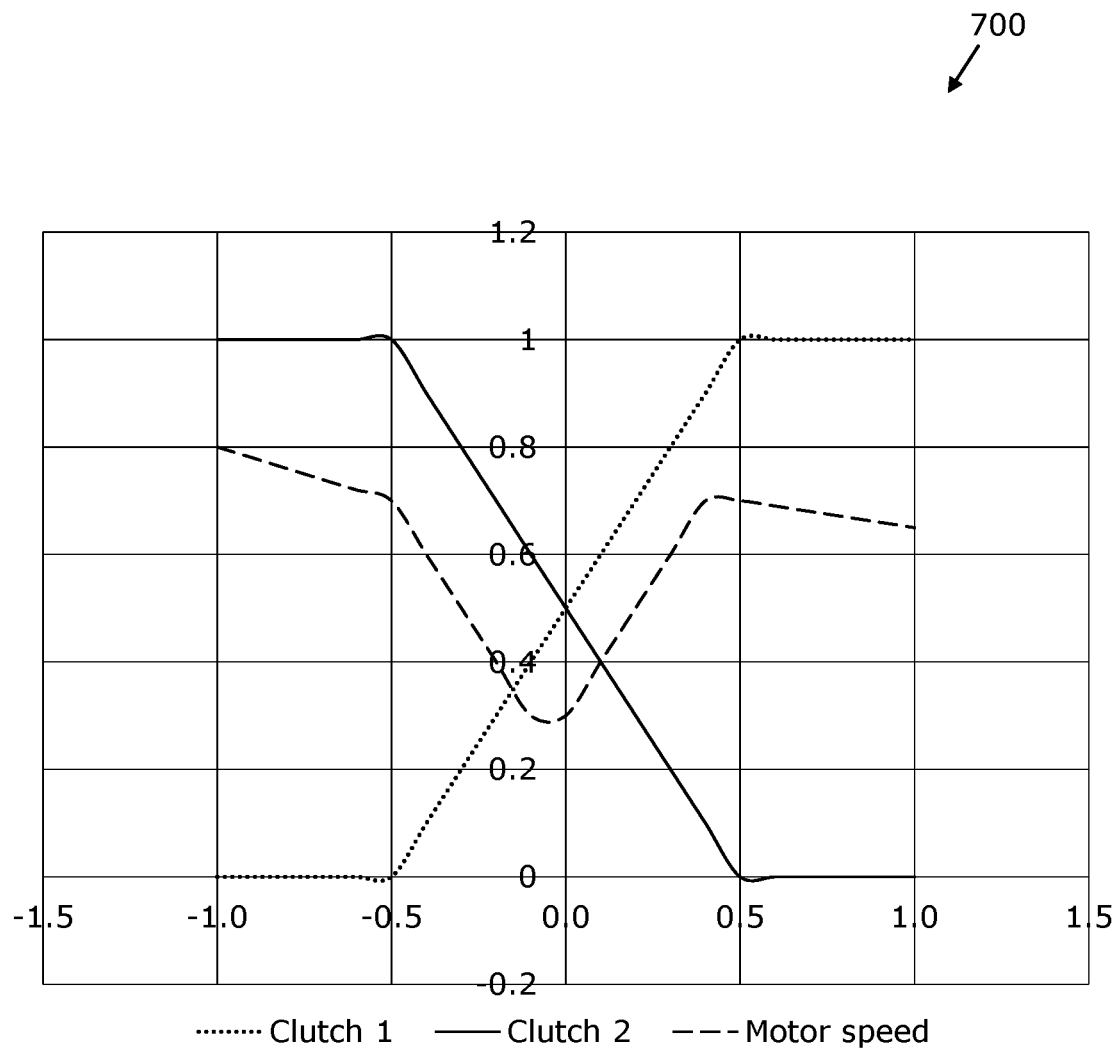
FIG. 7 is a graphical representation of deacceleration parameters of an electromechanical system, in accordance with an embodiment of the present disclosure.

Referring to FIG. 7, there is illustrated a graphical representation 700 of deacceleration parameters of an electromechanical system, in accordance with an embodiment of the present disclosure. As shown, as the gear ratio is changed from a Case 1 (i.e. the first clutch in the close configuration (gear ratio 1) and the second clutch in the open configuration) to a Case 2 (i.e. the first clutch in the open configuration and the second clutch in the close configuration (selected according to third gear member e.g. 2, 3, 4, 5, 6 or 7)), the motor speed decreases relatively to a maximum motor speed.

Figure 8:
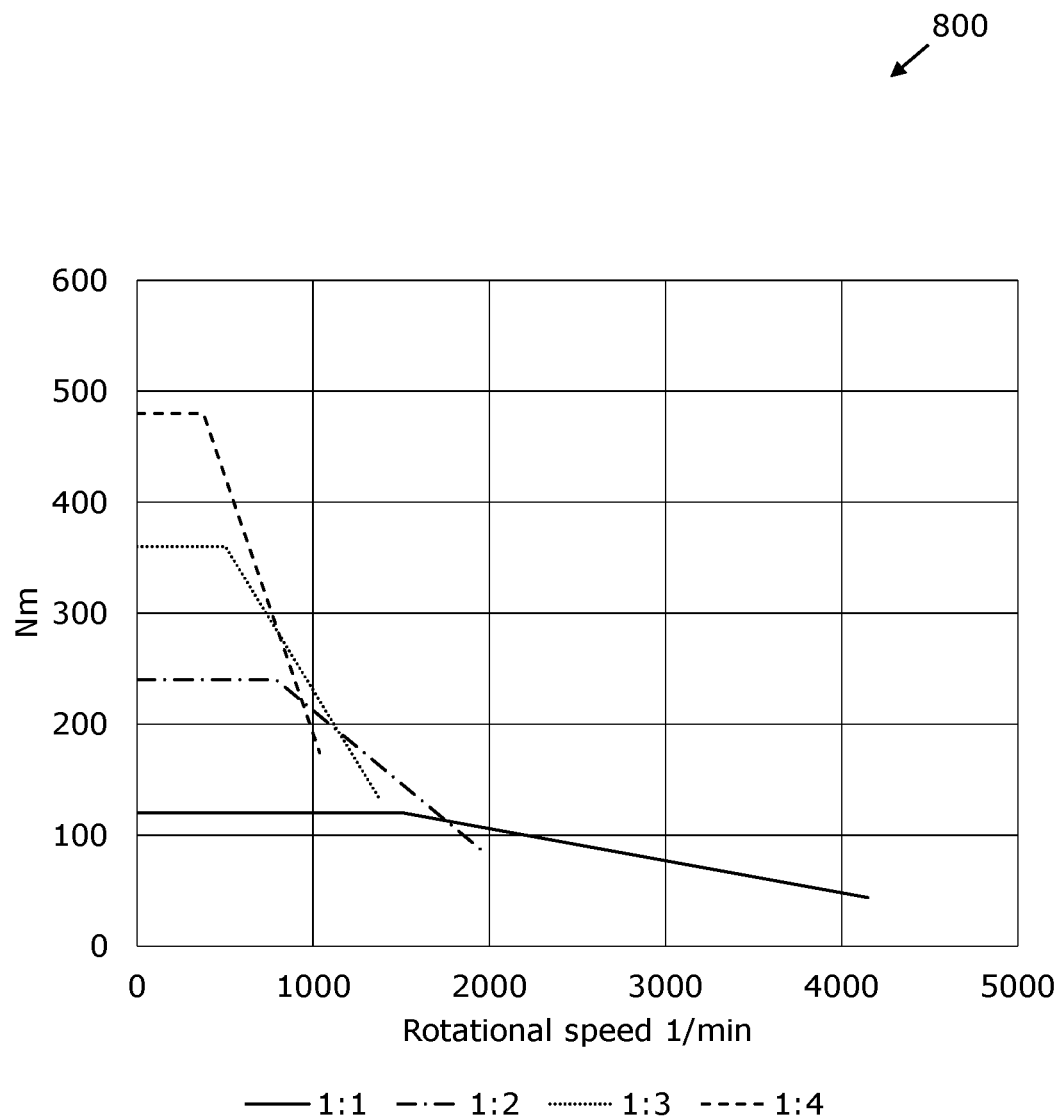
FIG. 8 is a graphical representation of change of gear ratio based on speed of a motor and the momentary torque on the input shaft of an electromechanical system, in accordance with an embodiment of the present disclosure.

Referring to FIG. 8, there is illustrated a graphical representation 800 of change of gear ratio based on speed of a motor and the momentary torque on the input shaft of an electromechanical system, in accordance with an embodiment of the present disclosure. As shown, a gear ratio of 1:4 changes to 1:1 at 1000 rpm, gear ratio of 1:3 changes to 1:1 happens at 1300 rpm, and the gear ratio of 1:2 changes to 1:1 happens at 1700 rpm.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A configurable seamless shift gearbox comprising:
an input shaft configured to receive an input torque from a motor;
an output shaft configured to provide an output torque;
a gear arrangement engaged between the input shaft and the output shaft, configured to drive a torque from the input shaft to the output shaft, the gear arrangement comprising:
 a first gear member coupled to the input shaft,
 a second gear member,
 a third gear member configured to intermesh with the first gear member and the second gear member, and
 a fourth gear member configured to rotationally arrange the third gear member thereon;
a first clutch coupled with the input shaft and configured to variably engage and disengage with the fourth gear member of the gear arrangement to transfer the input torque from the input shaft to the gear arrangement; and
a second clutch coupled with the output shaft and configured to variably engage and disengage with the second gear member of the gear arrangement to transfer the input torque from the gear arrangement to the output shaft,
wherein the first clutch and the second clutch selectively engage and disengage with the fourth gear member and the second gear member, respectively, at the same time to enable variable gear ratios for providing a seamless torque from the input shaft to the output shaft,
sensors selected from at least one of: a temperature sensor, and a motion sensor,
wherein the temperature sensor is configured to measure a temperature of the first clutch and the second clutch and a temperature of oil inside the configurable seamless shift gearbox, and
wherein the motion sensor is configured to measure a speed of the motor, a speed of the input shaft, and a speed of the output shaft.

2. The configurable seamless shift gearbox according to claim 1, wherein the configurable seamless shift gearbox provides:
a first gear ratio having both the first clutch and the second clutch in an open configuration;
a second gear ratio having the first clutch in the open configuration and the second clutch in a closed configuration;
a third gear ratio having the first clutch in the closed configuration and the second clutch in the open configuration; and
a fourth gear ratio having both the first clutch and the second clutch in the closed configuration.

3. The configurable seamless shift gearbox according to claim 2, wherein the first clutch and the second clutch are in:
the open configuration when the first clutch and the second clutch are not engaged with the fourth gear member of the gear arrangement and the second gear member of the gear arrangement, respectively; or
the closed configuration when the first clutch and the second clutch are engaged with the fourth gear member of the gear arrangement and the second gear member of the gear arrangement, respectively.

4. The configurable seamless shift gearbox according to claim 1, wherein a gear ratio is in a range of 1:1 to 1:10.

5. The configurable seamless shift gearbox according to claim 1, wherein at least one of the first clutch and the second clutch is an electric multi-plate clutch.

6. The configurable seamless shift gearbox according to claim 1, further comprising a pair of bearings, arranged on end portions of the gear arrangement, configured to rotatably support the input shaft, the output shaft and the gear arrangement.

7. An electromechanical system comprising:
a motor configured to provide an input torque;
an electromechanical cylinder to receive an output torque;
a configurable seamless shift gearbox that is mechanically coupled to the motor via an input shaft to receive the input torque therefrom, and the electromechanical cylinder via the output shaft to deliver output torque thereto, wherein the configurable seamless shift gearbox comprises:
 a gear arrangement engaged between the input shaft and the output shaft, configured to drive torque from the input shaft to the output shaft, the gear arrangement comprising:
  a first gear member coupled to the input shaft,
  a second gear member,
  a third gear member configured to intermesh with both the first gear member and the second gear member, and
  a fourth gear member configured to rotationally arrange the third gear member thereon;
 a first clutch coupled with the input shaft and configured to variably engage and disengage with the fourth gear member of the gear arrangement to transfer the input torque from the input shaft to the gear arrangement; and
 a second clutch coupled with the output shaft and configured to variably engage and disengage with the second gear member of the gear arrangement to transfer the input torque from the gear arrangement to the output shaft,
 wherein the first clutch and the second clutch selectively engage and disengage with the fourth gear member and the second gear member, respectively, at the same time to enable variable gear ratios for providing a seamless torque from the input shaft to the output shaft; and
a control unit configured to control:
 the motor to: start, stop, and adjust speed of the input shaft; and
 the first clutch and the second clutch to selectively engage and disengage with the gear arrangement,
sensors selected from at least one of: a temperature sensor, and a motion sensor,
wherein the temperature sensor is configured to measure a temperature of the first clutch and the second clutch and a temperature of oil inside the electromechanical system, and
wherein the motion sensor is configured to measure a speed of the motor, a speed of the input shaft, and a speed of the output shaft.

8. The electromechanical system according to claim 7, wherein the control unit controls the first clutch and the second clutch such that the first clutch is closed and simultaneously the second clutch is opened with a controlled speed.

9. The electromechanical system according to claim 7, wherein the control unit controls the speed of the motor based on a change in the gear ratio.

10. The electromechanical system according to claim 7, wherein the control unit is associated with a memory unit, and wherein the memory unit stores data associated with at least one of: the motor, the electromechanical cylinder, the configurable seamless shift gearbox, the gear ratio, and sensor data.

11. The electromechanical system according to claim 7, wherein the motor is an electric motor.

\* \* \* \* \*